United States Patent [19]

Tamura

[11] 4,214,722
[45] Jul. 29, 1980

[54] POLLUTION REDUCING AIRCRAFT PROPULSION

[76] Inventor: Raymond M. Tamura, 218 Lagoon Dr., Honolulu, Hi. 96819

[21] Appl. No.: 961,061

[22] Filed: Nov. 15, 1978

Related U.S. Application Data

[63] Continuation of Ser. No. 532,646, Dec. 13, 1974, and Ser. No. 788,526, Apr. 18, 1977, abandoned, and a continuation-in-part of Ser. No. 788,528, Apr. 18, 1977.

[51] Int. Cl.² ............................................. B64C 21/02
[52] U.S. Cl. ..................... 244/208; 244/207; 244/73 R; 60/39.17; 60/39.52; 60/263; 416/20 A; 416/90 A
[58] Field of Search ............... 244/204–215, 244/130, 62, 73 R; 416/20 R, 20 A, 90 R, 90 A, 91, 21; 60/224, 39.07, 39.09 D, 39.17, 39.52, 226 R, 229, 263, 39.5

[56] References Cited

U.S. PATENT DOCUMENTS

| | | | |
|---|---|---|---|
| 2,478,792 | 8/1949 | Trey | 244/207 |
| 2,516,489 | 7/1950 | Stalker | 244/208 |
| 3,442,082 | 5/1969 | Peterson | 60/224 |
| 3,887,147 | 6/1975 | Grieb | 244/207 |

FOREIGN PATENT DOCUMENTS

| | | | |
|---|---|---|---|
| 499833 | 12/1950 | Belgium | 244/208 |
| 539614 | 8/1927 | Fed. Rep. of Germany | 244/208 |
| 893103 | 5/1944 | France | 244/207 |
| 1161707 | 9/1958 | France | 244/207 |
| 634332 | 3/1950 | United Kingdom | 416/20 |

OTHER PUBLICATIONS

Ernst, et al., "YC14 System for Leading Edge Boundary Layer Contral", CAS1/A1AA, Meeting, Toronto, Canada, 10/30/74.

*Primary Examiner*—Galen L. Barefoot
*Attorney, Agent, or Firm*—James Creighton Wray

[57] ABSTRACT

Aircraft engine exhaust is mixed with air and fuel and recombusted. Air is drawn into the secondary combustion chamber from suction surfaces on wings. Exhaust of the secondary combustion chamber is blown over wing and fuselage surfaces.

7 Claims, 6 Drawing Figures

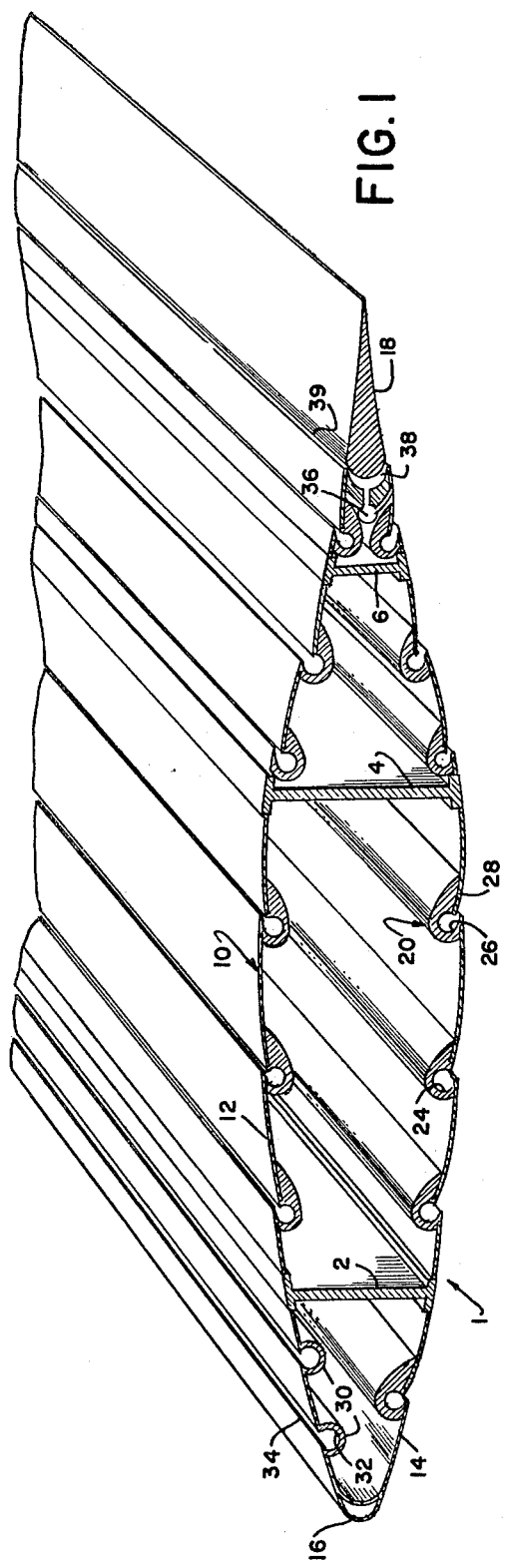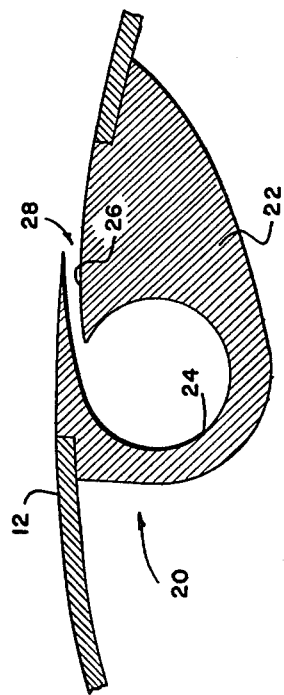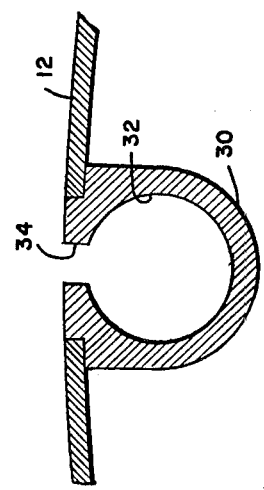

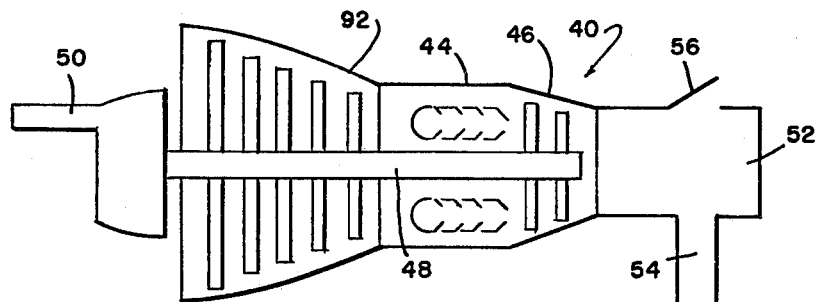
FIG. 4
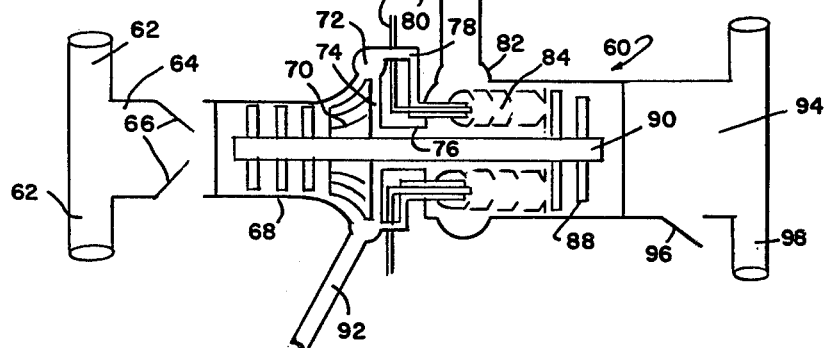
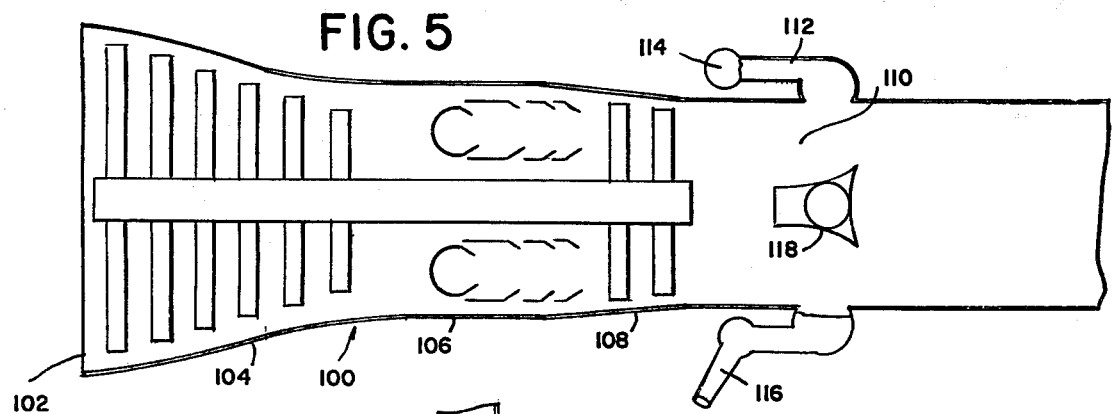
FIG. 5
FIG. 6
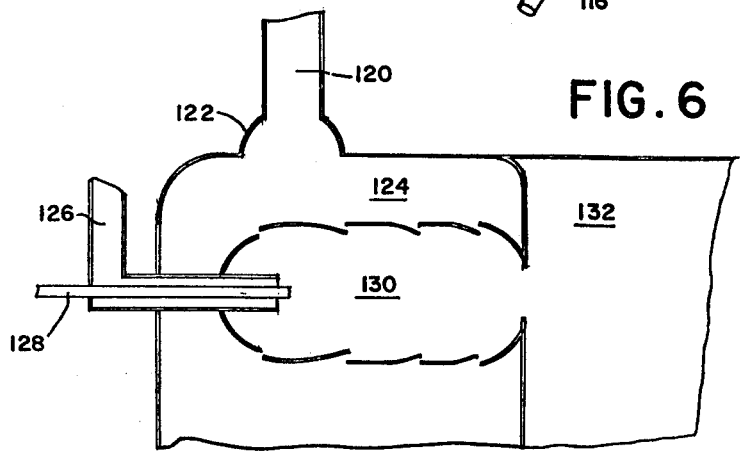

POLLUTION REDUCING AIRCRAFT PROPULSION

BACKGROUND OF THE INVENTION

This is a continuation of patent application Ser. No. 532,646, filed Dec. 13, 1974, and patent application Ser. No. 788,526, filed Apr. 18, 1977, by Raymond M. Tamura, entitled Pollution Reducing Aircraft now abandoned. This is a continuation-in-part of patent application Ser. No. 788,528, filed Apr. 18, 1977, by Raymond M. Tamura, and entitled Helicopter Lifting and Propelling Apparatus.

With greater pressures from the Environmental Protection Agency to regulate turbine emissions, there is an urgency in seeking solutions for economical propulsive methods. Low nitrogen oxide levels dictated by the EPA are incompatible with present turbine power plants. Turbine efficiency dictates fuel combustion at higher and higher temperatures. That approach to efficiency creates greater quantities of nitrogen oxides, as well as oxides of sulfur, phosphorus and chromium.

The aviation industry is faced with the tasks of using less fuel and of burning fuel at lower temperatures, which mean incomplete combustion and lowered efficiency. The present invention seeks to accomplish those tasks.

SUMMARY OF THE INVENTION

The present invention is a system which produces high lift during take-off and landings and which reduces friction and parasite drag during cruise without excessive fuel consumption. The present system utilizes the partially unburned fuel of a reciprocating engine, turboprop engine, jet engine or turbofan engine to power a turbine which suctions and blows air over wings, area-ruled regions of the fuselage and over vertical and horizontal stabilizers.

This system increases efficiency in a two-fold manner. It extracts the greatest possible quantum of heat energy from a given aliquot of fuel injected into the primary propulsive engine. By reducing friction drag, a given quantum of propulsive power is translated into greater velocity or greater lift.

One embodiment of the invention is described with relation to turbine power plants which are representative of present state of art. In a turboprop system the entire exhaust mass is directed to the combustion section of a compressor-suction turbine. This exhaust from the turboprop is swirled and is mixed with bleed air from the compressor of the compressor-suction turbine. Fresh fuel also is swirled with this mixture. The combustor will be of sufficient length to permit complete combustion.

The quantity of fresh fuel in the compressor-suction turbine is on the order of 0.1 or 0.2 specific fuel consumption, while the turboprop may be of the order of 0.5 to 0.6 specific fuel consumption.

Exhaust from the compressor-suction turbine is ducted to filleted areas of the fuselage-wing junction to smooth air flow and is ducted to the area-ruled region of the fuselage for reducing wetted area as well as for increasing air flow velocity.

The compressor section of the compressor-suction turbine is tied into a system which suctions boundary layers of the wing. This compressor's primary air mass is led to wing ducts which blow air over the wing in a chord-wise direction. That reduces friction drag, since the shear forces between two fluid layers moving in the same direction are much less than shear forces between a solid surface and a fluid media. This is most crucial during cruise. It is operative during take-off and landing so that lift is increased.

In an embodiment used in a turbojet system, the primary exhaust mass is ejected out of the tail pipe as in any other turbojet. Combustion gases cool rapidly after the passing through the turbine - especially that layer adjacent to the tail pipe wall. There, combustion has practically ceased. NASA type ducts bleed off that outer layer in the exhaust pipe and direct that mass to the combustion section of the compressor-suction turbine where identical events occur as described earlier.

In a turbofan system embodiment, boundary layer exhaust mass is bled off and directed in the same manner to the compressor-suction turbine. But in the turbofan, some air mass is bled off the fan section as well as the compressor section. Again, the same events occur in the compressor-suction turbine as explained earlier.

The exhaust from a reciprocating engine is also ducted to a compressor-suction turbine where more complete combustion can occur. Manufacturers of these engines face the same prohibitive restrictions as the turbine manufacturers.

The present system has major differences from past attempts at blown wings. The entire wing surface is blown and suctioned during cruise as well as during take-off and landing. Ducts which suction and blow air are integral, weight-bearing structures. Because of the compressor-suction turbine, a slight increase in specific fuel consumption must be borne in reducing effective wetted areas and thereby in reducing drag. The suctioned and blown boundary layer has less shear vectors opposing one another. A laminar flow airfoil is used in an example, but a supercritical airfoil also benefits from this system, since turbulence is attenuated and the critical boundary layer is shifted further toward the trailing edge or beyond it. This pushes cruise velocity to a higher subsonic value.

The blower and suction ducts are stringers and integral parts of the primary wing structure. This method avoids the problems created by having separate ducts. A three spar structure is proposed for fail-safe reasons. Wing skin plates are bonded or brazed to the ducts and ribs. The wing is set and can be urethane foam-filled for military applications.

Leading edge slats are automatic in a preferred embodiment. The suction ducts smooth turbulent flow when the slats are extended. Full-span double slotted flaps are blown during take-off, landing and most significantly, during cruise. Blown air energizes the very last segment of air flow over the top surface and thus creates a differential pressure which adds to the lift vector during cruise, thereby reducing power requirements.

Unlike blown flap systems, which are not operational during cruise, the present system has the blower duct integral wth the wing primary structure. As the flap is retracted, it abuts against the duct, which is slotted, sealing the slot. The forward flap segment is channeled to abut against the blower duct. This channel is open to the slot in the flap and blows air over the top surface during cruise. When the flap is extended, air continues to be blown over the flap, and in addition, the channel in the forward segment directs air over the top surface of the flap.

The concept of a blown wing has been used in the past and is being used at the present. Past and present systems are used only during the landing and take-off phases of operation. Past and present systems are designed only for creating lift.

The system described herein is designed to create lift as well as to reduce drag. This system is operative in all phases of flight; especially during cruise, which is the greatest segment of flight. An important feature of the invention is the fact that the ducts which are used for suction and blowing of boundary layer air are primary load bearing and therefore are structurally integral with the primary wing structure. This permits a light-weight design. Past and present efforts in this area had non-structural ducts which were not primary load bearing members and therefore not structurally integral. These wings were heavy because of that extra plumbing. Past and present systems have separate primary propulsive engines and suction/blowing engines. No energy from the primary propulsive engine is used in the suction and blowing engines. The present invention utilizes unburned fuel from the primary propulsive engine. This unburned fuel is used in the suction/blowing engine. The present invention also utilizes exhaust from the suction/blowing engine to reduce drag over fuselage and control surfaces. This is accomplished by ducting exhaust to these areas. Some of the blown air is used for this purpose.

Systems which may use ram air from the leading edge ducted to the upper surface of the wing do not have the present invention if ducts are not primary load bearing structures. Ram air systems may operate during all phases of flight, but the aircraft has to be in forward motion before they function.

The differences in the present invention are due in part to the fact that this system sucks boundary layer air and blows it over the surface through primary load bearing structures. Air is accelerated by a suction/blowing engine. The present system functions even though the aircraft does not have foward motion.

The rationale for suction of boundary layer air is delineated by *Modern Developments in Fluid Dynamics*, Vol. II, edited by S. Goldstein. According to that text, induced drag of fluid flowing over surfaces is caused by separation of a laminar boundary layer. This separation can be prevented, even in the presence of quite large pressure gradients, by a relatively small withdrawal of air from the boundary layer at or near the point where separation occurs. The quantity of air which must be removed may be as little as 5 percent of the total air mass in the boundary layer passing the suction duct. The suction device to accomplish this task need have an efficiency of only 75 percent, and the work required to remove this quantity of air is as little as 3.4 percent of the boundary layer kinetic energy at the point where the suction duct is located.

Thus, the suction/blowing device of the present invention need not be as large as the primary powerplant. This makes the present system unlike systems which use a primary propulsion engine to blow the wings. While such devices consume as much fuel as a primary propulsion engine, the present suction/blowing device increases fuel consumption by 0.1 to 0.2 specific fuel consumption. This device can be operated continuously without severe fuel penalties. Since this device uses incompletely burned fuel from the primary propulsion engine, overall efficiency is increased, and there is drastically reduced environmental pollution with nitrogen oxides, carbon monoxide and other harmful combustion by-products.

*Modern Developments in Fluid Dynamics* states that best results are obtained with the suction slot 53.9 percent of the chord back from the leading edge, and that slot width should be 0.67 to 3.8 percent of the chord.

The present wing does not follow that placement regimen because this wing is combined with blowing, and this sytem is designed for decreasing drag as well as generating lift. The present suction slot is 0.67 percent of the chord. This is varied for specific wing sections and designs.

The text on fluid dynamics treats lift and drag as separate entities. Suction and blowing are also dealt with separately.

In the invention, lift and drag as well as suction and blowing occur simultaneously.

The International Dictionary of Applied Mathematics states, ". . . It is necessary to assume that some disturbances are present in the initial laminar flow, even if these are extremely small. In practice, disturbances may be caused by very slight roughness of the surface, turbulence of the main stream or sound waves." "When the laminar flow is unstable, disturbances are amplified as they proceed downstream and eventually "spots" of turbulent flow appear . . . . "As the spots of turbulence proceed downstream they grow in size, so that for points in the boundary layer further downstream the flow is turbulent for a greater proportion of the total time. Eventually, a point is reach, sufficiently far downstream, where the flow is turbulent all the time . . . . "

The present system blows air over the posterior aspects of the wing on upper and lower surfaces. This smooths out the boundary layer by decreasing these turbulent spots. Mathematically, this process modifies the Navier-Stokes equations of motion for a fluid in which viscous stress is proportional to the rate of strain:

$$\frac{Du_i}{Dt} = \frac{\partial u_i}{\partial t} + u_j \frac{\partial u_i}{\partial x_j}$$

$$= -\frac{1}{\rho} \frac{\partial p}{\partial x_i} + F_i + \nu \frac{\partial^2 u_i}{\partial x_j \partial x_j} + \tfrac{1}{3}\nu \frac{\partial \Delta}{\partial x_i}$$

The upper line represents the inertia force of unit mass. The terms in the lower lines respectively identify a pressure gradient force, the body force per unit mass, viscous stresses resulting from straining or distorting the fluid, and contribution to the gradient of normal pressure resulting from a spatial variation of the dilation $\Delta$ (or rate of cubical expansion; $\Delta = \partial u_i/\partial x_i = \mathrm{div}\,v$)

The last term is zero in incompressible fluids and is usually neglected except in compressible flows with large accelerations. Since air is compressible and flows with large accelerations, this applies to aircraft structures. The term, $\nu$, is the dynamic viscosity. In vector notation, the equations are written $$\frac{Dv}{Dt} = \frac{\partial v}{\partial t} + (v \cdot \mathrm{grad})\,v$$

$$= -\frac{1}{\rho} \mathrm{grad}\,p + F + \nu(\mathrm{div}\,\mathrm{grad})v + \tfrac{1}{3}\nu\,\mathrm{grad}\,\mathrm{div}\,v$$

which may be rearranged in the form $$\frac{\partial v}{\partial t} + \tfrac{1}{2}\mathrm{grad}\,v^2 - v \times \mathrm{curl}\,v =$$

-continued $$-\frac{1}{\rho} \text{grad} p + F + \frac{4}{3} \nu \text{grad div } v - \nu \text{curl curl } v$$

The present system modifies several terms of this equation. Suction reduces pressure gradient force over the anterior surfaces, since suction removes slow moving air mass which progressively piles up as we measure posteriorly from the leading edge. Suction also reduces straining of the fluid as noted in the second term.

Blowing air over the posterior aspects of the wing modifies terms by different mechanisms. The pressure gradient force is reduced by entraining air mass flowing past the point of maximum pressure, and this accelerates air mass to the rear, removing pressure created by a piling up of air mass. Another mechanism is the reduction of sheer (friction) stress between wing surface and fluid. Althouh blown air velocity need not be equal to the velocity of air moving over the surface, sheer stress will be much less than with an unblown wing. Thus, the first, second and third terms are modified by these mechanisms. Blowing air will also reduce the fourth term by reducing the recirculation of air to the leading edge and by reducing the spatial variation of the dilation Δ.

In a preferred embodiment of the invention, aircraft wings have blower and suction ducts which extend through the wing beneath the skin interconnecting ribs. The ducts support the skin in fixed airfoil configuration. Preferably the ducts have outward directed elongated slots which extend through the airfoil skin. The skin of the airfoil in one form of the invention is elongated thin aluminum sheets which are secured between adjacent ducts, with slots exposed between adjacent sheet edges.

In one preferred form of the invention the blower ducts are constructed in somewhat tear-shaped cross sections with relatively bulbous parts facing inward and forward, and tapering rearward with smoothly curved relatively flattened out surfaces conforming to the airfoil shape. The outer surface is recessed to receive edges of the skin sheets.

Gas moves longitudinally through a large passageway in the bulbous portions of the ducts. Ducted gases exit laterally though narrow passageways to the outward slots.

In a preferred form of the invention the blower ducts are arranged at intervals along the wing surface, which intervals generally decrease rearwardly, so that the spaces between slots at a rear surface of the airfoil is less than spaces between the slots at a relatively forward portion of the airfoil surface.

Suction ducts communicate with and support the upper wing surface between the leading edge and a ling of maximum foil thickness. In a preferred embodiment blower ducts are connected across the remainder of the wing. Blower ducts are provided near the trailing edge of a wing and a rearward blower duct has slots which blow gasses across surfaces of a trailing edge flap.

The suction duct has the same shape as the blower duct, in one embodiment. In a preferred form the blower duct has a rearward tapering tear-shaped cross section, and the suction duct has symmetrical U-shaped cross section.

All of the ducts are structural members, which preferably act as stringers to transfer loads between the airfoil surface and the ribs of the airfoil. Consequently, little weight is added to the airfoil by the duct system.

In one embodiment of the invention the duct system and the skin are integrated in an apparatus with a substantially flat slotted surface and with the ducts form a raised pattern on the inside surface. In another embodiment of the invention the duct slots are integral with the surface formation and form a foraminous surface. In another form of the invention the actual airfoil surface is not smooth but the aerodynamic surface formed by the blown air cooperating with ambient air is smoothed.

In a preferred form of the invention the ducting and blowing and suction slots are provided in all aerodynamic surfaces of the aircraft including the wings, fuselage and empenage and primary and secondary control surfaces and, surfaces interconnecting the parts of the aircraft.

The system of the present invention is useful with all aerodynamic surfaces and is useful with all wing plan forms and sections including those especially designed for subsonic, transonic and supersonic operation.

In a preferred form of the invention the gas blown through the ducts is chilled to cool the wing surface and thus promote laminar flow of the ambient air. The chilling of the gas is accomplished by heat exchangers in which heat is dissipated by cabin heating and interior space heating. The gas in the blowing ducts is cooled before eoing distribution by contacting the gas with chilled fuselage surfaces and by otherwise refrigerating the gas.

Blower ducts at primary and secondary control surfaces and ducts near leading portion are supplied with warm, moisture reduced gas to avoid icing.

In a preferred embodiment gas is supplied under pressure to the ducts to provide even outflow across the blown surfaces. Areas of increased turbulence are provided with greater blowing gas flow by conventional ducting flow variation techniques.

Gas is withdrawn from suction ducts and gas under pressure is fed to blower ducts by using exhaust energy from propulsion engines.

A blower engine, preferably a turbine, is supplied with air from suction ducts. Demand valves at the inlet are opened automatically upon reduced pressure at the intake to supply ambient air to the auxiliary turbine. The air is turbine driven. Hot exhaust from the propulsion engine is supplied to the combustion section of the auxiliary turbine. Unburned hydrocarbons in the propulsion engine exhaust are oxidized in the excess of air in the turbine. A small amount of fuel is sprayed into the combustion chamber to further burn and drive the incoming air and exhaust gas from the main engine combustion chambers. These are surrounded by gas spaces to keep the combustion temperatures relatively cool and to ensure complete mixing of the elements for complete combustion. Nitrogen oxides are avoided, and $CO_2$ and water vapor with excess air result.

The gasses flow from the auxiliary turbine into a plenum whereover pressures are released automatically to keep the turbine at maximum design operation. The gasses are cooled in a heat transfer refrigeration apparatus and are flowed through conduits to the blower ducts and outlet slots where the gas is discharged under pressure rearward along the aerodynamic surface.

One object of the invention is the provision of a pollution reducing aircraft propulsion system having an aircraft with a fuselage and airfoil surfaces, an engine mounted on the aircraft, means connected to the engine for propelling the aircraft and an input and output connected to the engine for feeding and exhausting the engine, collecting means connected to the output for collecting matter therefrom, combustion means connected to the collecting means for receiving matter therefrom, intake means connected to the combustion means for flowing combustion sustaining material to the combustion means whereby combustion occurs in the combustion means, exhaust means connected to the combustion means for conducting exhaust from the combustion means, ducting means connected to the exhaust means for conducting exhaust therefrom and distribution means connected to the ducting means and connected to an exterior of the aircraft for distributing exhaust from the aircraft over aerodynamic surfaces of the aircraft.

Another object of the invention is the provision of blower ducting means comprising a plurality of parallel ducts mounted as structural members inside skin surfaces of an aircraft and supporting the surfaces.

Another object of the invention is the provision of a boundary air blower engine with wing blower ducts connected to the intake compressor and blower means for withdrawing air before combustion and flowing withdrawn air over aerodynamic surfaces of the aircraft.

Another object of the invention is the provision of a boundary air blower system with elongated ducts extending along a airfoil beneath its outer surface and having passageways extending to the surface.

Another object of the invention is the provision of a boundary layer blowing system with suction ducts mounted in a forward upper portion of the airfoil and blower ducts mounted in a rearward upper portion of the airfoil.

Another object of the invention is the provision of a boundary layer blower system with blower ducts mounted along a lower surface of the airfoil.

Another object of the invention is the provision of wing blower ducts having a tear-shaped cross section with a bulbous foward section containing a main passageway, and a tapered rearward section containing a restricted rearward directed passageway leading to a slot on a surface for blowing gas from the main passageway rearward over the surface.

Another object of the invention is the provision of a boundary layer control system having a blower duct in a trailing edge of an airfoil having a main passageway extending along the duct and having a passageway extending rearward then upward and downward to slots along a flap for directing blown gas rearward over the flap.

These and further objects and features of the invention are apparent in the disclosure, which includes the foregoing and following specification and claims and the drawings.

BRIEF DESCRIPTION OF THE DRAWINGS

FIG. 1 is a schematic view of a wing showing the blowing and suction ducts and intake and exhaust slots.

FIG. 2 is a cross sectional detail of a blower duct.

FIG. 3 is a cross sectional detail of a suction duct.

FIG. 4 is a schematic representation of an aircraft propulsion engine and an auxiliary turbine for drawing the blowing system.

FIG. 4A is a schematic representation of the wing.

FIG. 5 is a schematic detail of jet propulsion engine apparatus with partial exhaust removal for feeding the auxiliary engine.

FIG. 6 is a detail of an auxiliary engine combustion chamber used with a jet engine exhaust source such as shown in FIG. 5.

DETAILED DESCRIPTION OF THE DRAWINGS

Referring to FIG. 1 a wing having a blown air system of the present invention is referred to by the numeral 1. The wing, is supplied with spars 2, 4, and 6 which are of conventional design and which are schematically shown as I-beams. The wing as is conventional is provided with primary aileron controls and secondary flap and slat controls to provide increased lift in landing and taking off. The interior of the wing is provided with power lines actuators and fuel storage tanks in a conventional manner.

Conventional wing ribs, not shown, interconnect the spars. An airfoil surface member 10 is made up of parallel plates on upper surface 12 and lower surface 14. The leading edge 16 of the airfoil is provided with a conventional slat structure. The trailing edge of the airfoil is provided with a flap 18 to increase lift during relatively low speed operation.

Blower and suction ducts are arranged as load-bearing stringers between conventional ribs, replacing the conventional stringers which support the airfoil skin 10. With reference to FIG. 1 and the detail in FIG. 2 blower ducts 20 have tear-shaped cross sections 22. The passageway 24 located in the bulbous portion of the duct supplies gas to restricted rearward directed passageway 26 which releases a predetermined uniform flow of gas through slot 28. As shown in FIG. 2, forward and rearward edges of the upper surface of the blower duct 20 are recessed to receive the adjacent surface plate members in flush mounting.

Referring to FIGS. 1 and 3 the suction duct 30 has a "U" shaped cross section. Passageway 32 pulls air directly from restricted slot 34. Upper surfaces of the ducts 30 are recessed to receive adjacent edges of the surface plates.

A rearward blower duct 36 supplies gas to upper and lower forks of passageway 38 which releases gas rearward through slot 39 over flap 18.

A conventional turbine type main propulsion engine is generally indicated by the numeral 40 in FIG. 1. A compressor 42 forces air into burner section 44. combustion products drive turbine blades in section 46, which turn shaft 48, drawing the compressor blades in section 42 and driving a propellor shaft 50 through the intermediate reduction gearing.

The engine exhaust flow into an exhaust plenum chamber 52 and out through an exhaust duct 54. An over pressure relieve valve 56 releases excessive exhaust gasses to the atmosphere.

An auxiliary engine 60 for blowing air purposes receives the exhaust gas from stack 54. Air from boundary layer suction ducts is drawn in through conduits 62 into plenum 64. Automatic blow-in doors 66 admit ambient air when auxiliary engine intake pressure falls below ambient pressure. A compressor in section 68 provides suction and drives the air toward blower to which further compresses the air into collection ring 72. Compressed air flows through air lines 74 and 78 past the fuel sprayer elements 76, which are served by fuel line 80.

A diffuser ring admits exhaust gasses from main exhaust duct 54 to the combustion chamber 84, where unburned products from the main exhaust are mixed with fuel in an excess of air and are combusted, producing an exhaust with a high kinetic energy.

The exhaust drives fan blades 88 driving shaft 90, which in turn spins the compressor 68 and the blower 70. Blower 70 forces air out conduit 92 which leads to some boundary layer blower ducts.

The exhaust of the auxiliary blower engine 60 passes into exhaust plenum 94 and out through conduits 98 to the blower ducts. Overpressure relief valve 96 dumps excessive exhaust into the atmosphere in unusual operating circumstances.

As shown in FIG. 5, the present system is used with a jet propulsion engine 100. Air is drawn through intake 102 and compressed in section 104 by compressor blades in a conventional manner. Fuel is injected and ignition occurs in combustion section 106. Turbine 108 drives compressor 104. Exhaust and excess air are driven through exhaust pipe 110. A NASA scoop and duct 118 created in a high pressure area divert some of the exhaust through passageway 112 to collector ring 114, from where the exhaust flows through tube 116.

As shown in FIG. 6, the tapped main engine exhaust from tube 116 flows through tube 120 to diffuser ring 122 and into a preheat area 124 of an auxiliary engine, shown in partial view. Fluids from tubes 126 and 128 are flowed into annular combustion chamber 130. Air and unburned material from the main exhaust are recombusted with the added fuel and the exhaust flows to plenum 132 for distribution through conduits to the blower ducts.

Although the invention has been described with reference to specific embodiments, it will be obvious to those skilled in the art that further embodiments may be constructed and used without departing from the scope of the invention. The scope of the invention is defined in the following claims.

I claim:

1. An aircraft pollution reducing propulsion airfoil system comprising a wing having upper and lower surfaces comprising wing skin plates extending longitudinally on the wing and being spaced one from another in chordwise directions, spars extending into the wing between the surfaces, stringer ducts extending along internal sides of the wing surfaces, the stringers having relatively rigid surface-supporting structure and having outward directed openings extending across the wing surfaces, interrupting the wing surfaces between edges of the wing skin plates, the ducts thereby forming stringer structural elements supporting the wing skin plates, the outward directed openings of the stringer ducts being arranged perpendicularly to the wing surfaces in a leading portion of the wing and tangential to the wing surfaces in a trailing portion of the wing surfaces, suction means connected to the stringer ducts with perpendicular openings for drawing gas into the ducts through those openings and blowing means connected to the ducts with tangential openings for flowing gas out of the tangential openings, combustion means connected to the suction means and to the blowing means for accelerating gas through the means.

2. The system of claim 1 wherein leading portions of wing skin plates are inwardly curved toward the tangential openings.

3. The system of claim 1 wherein each stringer duct with a tangential opening has a tear-shaped cross section with a bulbous forward section containing a main passageway, and a tapered rearward section containing a restricted rearward directed passageway leading to a slot on a surface for blowing gas from the main passageway rearward over the surface.

4. The system of claim 1 further wherein the blowing means further comprises a blower duct in a trailing edge of an airfoil, having a main passageway extending along the duct and having a passageway extending rearward then upward and downward to slots along a flap for directing blown gas rearward over the flap.

5. The system of claim 2 wherein edges of the wing skin plates are recessed in the stringer ducts.

6. The system of claim 1 wherein the ducts comprise suction ducts mounted in a forward upper portion of the airfoil and blower ducts mounted in a rearward upper portion of the airfoil.

7. The system of claim 6 further comprising blower ducts mounted along a lower surface of the airfoil.

* * * * *